United States Patent [19]

Spargo et al.

[11] 4,334,688

[45] Jun. 15, 1982

[54] FLUID LUBRICATED FLOATING BUSHING SEAL

[75] Inventors: John D. Spargo; Kenneth R. Sasdelli, both of Annapolis, Md.

[73] Assignee: The United States of America as represented by the Secretary of the Navy, Washington, D.C.

[21] Appl. No.: 147,795

[22] Filed: May 8, 1980

[51] Int. Cl.³ .............................................. F16J 15/16
[52] U.S. Cl. ..................................... 277/175; 308/240
[58] Field of Search ................... 277/175, 22, 134, 80; 308/9, 36.3, 240, 100, 108, 98, 237 A

[56] References Cited

U.S. PATENT DOCUMENTS

| | | | |
|---|---|---|---|
| 2,479,349 | 8/1949 | Hagg | 308/240 |
| 3,268,232 | 8/1966 | Richards | 277/175 |
| 3,305,282 | 2/1967 | Arneson | 308/122 |
| 3,586,340 | 6/1971 | Otto | 277/134 |
| 3,989,424 | 11/1976 | Goloff | 277/22 |

Primary Examiner—Robert I. Smith
Attorney, Agent, or Firm—R. F. Beers; L. A. Marsh; W. W. Randolph

[57] ABSTRACT

A shaft seal assembly includes a rotor rotationally keyed to a propeller shaft; a non-rotating, floating bushing surrounding the rotor; and means for maintaining a fluid seal between the bushing and a housing for the seal assembly. The adjacent surfaces of the rotor and the bushing define a water lubricated bearing interface wherein one of the surfaces is formed of a thin, compliant material and the other surface has axially extending grooves formed therein. The lubrication grooves are arranged in an alternating pattern wherein adjacent lubrication grooves extend from opposite surfaces edges and have portions which axially overlap in spaced apart relationship.

16 Claims, 4 Drawing Figures

FLUID LUBRICATED FLOATING BUSHING SEAL

The invention described herein may be manufactured and used by or for the Government of the United States of America for governmental purposes without the payment of any royalties thereon or therefor.

BACKGROUND OF THE INVENTION

This invention generally relates to hydrostatically pressurized seal and bushing structures and more particularly to such structures having axially extending grooves to promote fluid lubrication.

Various types of "grooved" seal and/or bearing structures are disclosed in U.S. Pat. Nos. 3,655,248; 3,746,407; 4,105,267; 4,120,544; and 4,141,603. In some seal/bearing structures, the grooves are arranged on surfaces which rotate relative to each other such that the relative motion generates a hydrodynamic fluid pressure on lubricant in the grooves. The lubricant is thereby forced between the rotating surfaces to form a lubricating film. Other seal/bearing arrangements employ a hydrostatic pressure means to cause the lubricant to flow into the grooves as shown for example by U.S. Pat. Nos. 3,305,282 and 3,517,973. However, problems experienced with the prior art include contamination of the lubricant with pollutants, thereby causing increased friction and wear on the rotating surfaces.

SUMMARY OF THE INVENTION

The present invention overcomes problems experienced with the prior art and is expressly useful with water as a lubricant by providing an improved shaft seal assembly having increased shock and wear resistance wherein the shaft is lubricated by controlled leakage of fluid between elements of the shaft seal assembly. This is generally accomplished by constructing a shaft seal assembly comprising: a rotor element rotationally keyed to the shaft; a nonrotating, floating bushing surrounding the rotor; and means for maintaining a fluid seal between the bushing and a housing for the seal assembly.

The interface formed between the adjacent surfaces of the rotor and the bushing functions as a fluid lubricated bearing region wherein one of the surfaces comprises a thin, compliant elastomer bearing layer and the other surface includes axially extending lubrication grooves. The grooves comprise a first set of axial grooves which extend from a first edge of the grooved surface and terminate short of the other, second edge of the grooved surface, and a second set of axial grooves which extend from the second edge and terminate short of the first edge. The first and second sets of grooves are arranged in an alternating pattern wherein a first groove preferably extends between adjacent second grooves and vice-versa. The non-rotating, floating bushing may be contained within a circumferential recess in the housing and is spring biased to form a fluid seal between the low fluid pressure side of the shaft seal assembly and the higher fluid pressure in the housing recess. Seal means are provided on the bushing which permit radial displacements of the seal assembly within the housing recess while maintaining the fluid seal.

It is therefore an object of this invention to provide a seal assembly of efficient design which has improved lubrication and reduced wear characteristics.

Another object of this invention is to provide a seal arrangement having an effective lubrication interface defined by a compliant elastomeric surface and a grooved surface.

A further object of this invention is the provision of a seal assembly capable of radial displacements and which provides controlled lubrication of relatively moving surfaces.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may be best understood by reference to the following description taken in conjunction with the accompanying drawings, in which:

DETAILED DESCRIPTION OF THE DRAWINGS

Figure 1:
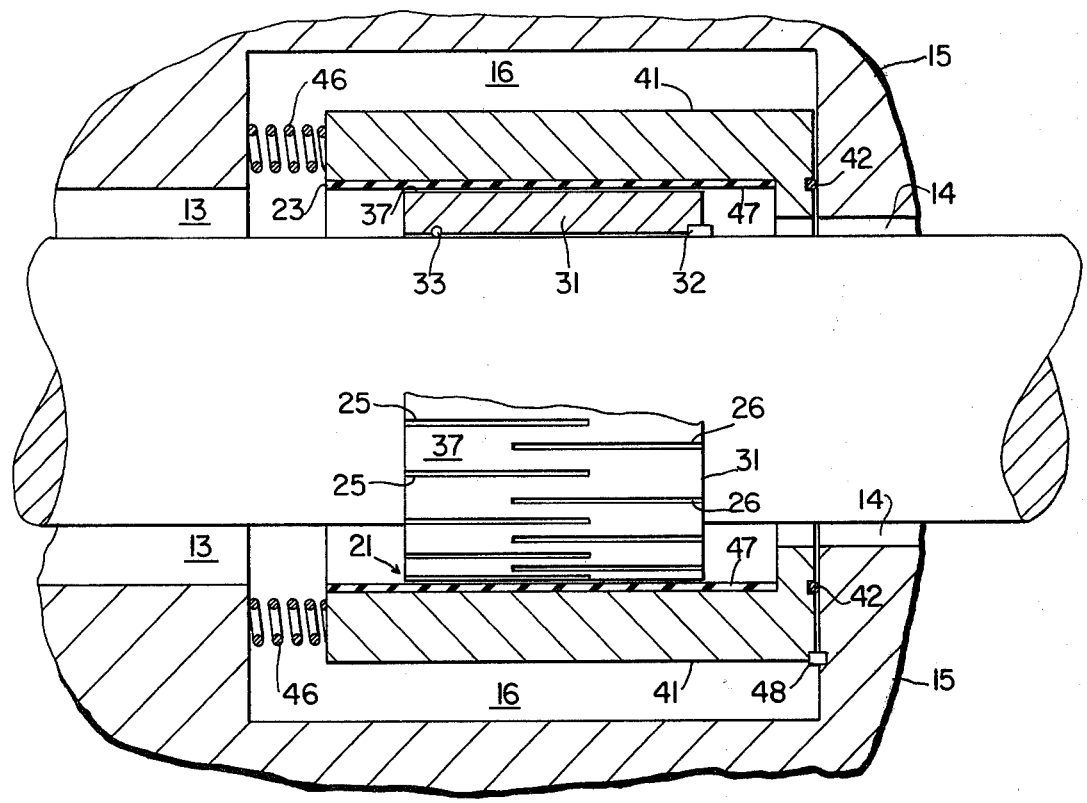
FIG. 1 is a partially broken away sectional view of the shaft seal assembly.

Referring now to the drawings, there is generally shown in FIG. 1, the shaft seal assembly 21 attached to a propeller shaft 12 and disposed in a recess 16 of housing 15. The seal assembly 21 generally comprises a cylindrical rotor element 31 encasing the propeller shaft 12 and rotationally keyed thereto; a nonrotating, cylindrical floating bushing 41 circumferentially surrounds the rotor 31; and means for maintaining a fluid seal between the seal assembly 21 and the propeller shaft 12 and housing 15.

Although preferably formed of a continuous cylindrical element to reduce the leakage paths between the high pressure side 13 and the low pressure side 14 of the seal assembly 21, the rotor 31 may be formed of segments which are connected together and attached to the propeller shaft 12. Means for rotationally keying the rotor 31 to the propeller shaft 12 include a key element 32, as shown in FIG. 1, which is disposed in conforming grooves in the rotor 31 and propeller shaft 12. Seal means in the form of an O-ring 33, for example, are disposed at the interface between the rotor 31 and the propeller shaft 12 to prevent fluid leakage therebetween.

Figure 3:
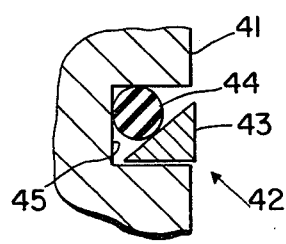
FIG. 3 is an enlarged view of the seal element for the floating bushing of FIG. 1.

The floating bushing 41, which, like rotor 31, is preferably a continuous cylindrical element, is capable of undergoing slight radial displacements due to radial movements of the propeller shaft 12. Seal means for preventing fluid leakage between the housing recess 16 and the low pressure side 14 of the shaft seal 21 are provided in the form of a seal 42 generally shown in FIG. 1 and more particularly shown in FIG. 3. In FIG. 3, which shows an enlarged view of the seal 42 in the upper portion of bushing 41 in FIG. 1, the seal includes an anti-extrusion ring 43 having a triangular cross-section and a compressible element 44 which is wedged in a groove 44, between the bushing 41 and the ring 43. In the disclosed arrangement, the ring 43 is disposed radially inwardly of the compressible biasing element 44, toward the low pressure side of the seal assembly 21. Biasing means in the form of spring member 46 forces the bushing 41 against surface 17 of housing recess 16 such that seal 42 forms an effective seal means for preventing flow of fluid therearound. A key element 48 is disposed in conforming grooves in the bushing 41 and housing recess surface 17 to prevent rotation of the bushing 41.

Figure 2:
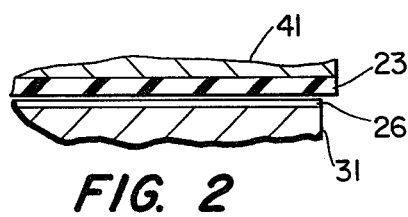
FIG. 2 is an enlarged view of the interface between the relatively moving parts of FIG. 1.

The interface defined by the surface 37 of rotor 31 and surface 47 of rotor 41 is designed to form a fluid lubricated region wherein controlled leakage therethrough is permitted. This is accomplished by forming one of the surfaces 37, 47 of a thin compliant elastomer material 23 and by forming the other of the surfaces 37, 47 with axially extending grooves 25, 26. Although the grooves 25, 26 are shown on the rotor surface 37 and the elastomer material 23 is shown forming the bushing surface 47 in FIGS. 1 and 2 for purposes of illustration, the arrangement may also be reversed. That is, the elastomer material 23 may form the rotor surface 37 and the grooves 25, 26 may be formed on the bushing surface 47.

The elastomer material 23, which may be selected from materials such as rubber, neoprene, Buna-N, polyurethane, carbon-graphites, polyamides, and polyimides, may have, for example a thickness of about one-eight of an inch to form a compliant wear surface which permits passage of contaminants and provides an efficient distribution of lubricant, for example, water.

Figure 4:
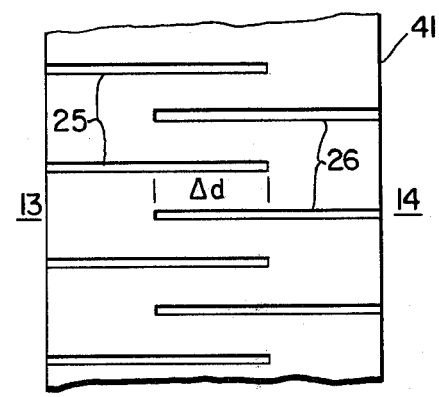
FIG. 4 is a plan view of a groove arrangement formed on a floating bushing element.

The first set of axial grooves 25, as more particularly shown formed in the bushing 41 in FIG. 4, extend from the high pressure side 13 of the shaft seal 21 and terminate short of the low pressure side 14 of the shaft seal 21. The second set of axial grooves 26 extend from the low pressure side 14 and terminate short of the high pressure side 13 of the shaft seal 21. The first and second sets of grooves 25, 26 are respectively arranged in an alternating pattern as shown in FIGS. 1 and 4, such that a first groove 25 extends axially between adjacent second grooves 26, and vice-versa. Generally, the optimum dimensions of the grooves 25, 26 and the elastomer material 23 is dependent on the dimensions of the seal members, the hydrostatic and hydrodynamic pressures involved and the conditions of use. However, the grooves will have a depth on the order of one-thirty-second of an inch and have an axial overlap, as represented by $\Delta d$ in FIG. 4, of from about 20% to about 50% of the axial width of the surface containing the grooves.

Under operating conditions the grooves 25, 26 and the compliant bearing layer formed by compliant material 23 interact to define a fluid lubricated interface wherein wear and heat build-up are reduced. For example, the bushing 41 deforms under load such that clearance with rotor 31 and thus the fluid film therebetween will be smaller at the low pressure end 14 than at the high pressure end. At low clearance regions, such as caused by differential compression of the bushing 41, the compliant material 23 is capable of a slight rippling deformation such that the lubricant forced from the grooves provides adequate cooling for the low clearance areas. Also, the compliant material 23 is also capable of passing grit and other particles contained in the fluid passing from grooves 25 to grooves 26, thus reducing wear on the surface containing the grooves 25, 26.

Obviously many modifications and variations of the present invention are possible in light of the above teachings. It is therefore to be understood that within the scope of the following claims the invention may be practiced otherwise than as specifically described.

What is claimed is:

1. A shaft seal assembly positioned between a rotating shaft and a housing therefore comprising:
   a cylindrical rotor portion affixed to a shaft having an axis of rotation;
   a floating bushing element radially enclosing said rotor wherein adjacent bearing surfaces on said rotor and said bushing define a fluid lubricated interface therebetween, one of said bearing surfaces consists of a plurality of first and second grooves extending substantially parallel with said shaft axis and arranged in an axially overlapping and offset relationship with each other, wherein a first groove extends between two adjacent second grooves, and the other of said bearing surfaces being a compliant surface cooperating with said first and second grooves to promote flow of fluid from said first grooves to said second grooves; and
   means for maintaining a fluid seal between said bushing and a housing while accomodating radial displacements of said bushing relative to the housing.

2. The assembly according to claim 1, wherein said compliant surface is formed of material selected from the group of neoprene, polyurethane, polyimide resins, polyamide resins, carbon-graphites and Buna-N.

3. The assembly according to claim 1, wherein said grooves have a depth of about one-thirty-second of an inch and said compliant surface has a depth of about one-eighth of an inch.

4. The assembly according to claim 1, wherein said one surface containing said first and second grooves includes first and second axially spaced surface edges, said first grooves extending axially of said one surface from said first surface edge and terminating short of said second surface edge and said second grooves extending axially of said one surface from said second surface edge and terminating short of said first surface edge.

5. The assembly according to claim 4, wherein said first and second grooves axially overlap in spaced apart parallel relationship from about twenty percent to about fifty percent of the distance between said first and second edges.

6. The assembly according to claim 4, wherein said first and second grooves axially overlap in spaced apart parallel relationship from about fifteen percent to about fifty percent of one-half the sum of the average length of the first and the second grooves.

7. The assembly according to claim 1, wherein said first and second grooves vary in length.

8. The assembly according to claim 1, wherein said means for maintaining a fluid seal comprises a spring means attached to one end portion of said bushing and connected to said housing for biasing the other end portion of said bushing against the housing to form a fluid seal therebetween.

9. A shaft seal assembly positioned between a rotating shaft and a housing enclosing the shaft comprising:
   a cylindrical rotor concentrically affixed to the shaft, the cylindrical rotor having first and second axially spaced radially extending surface portions and an axially extending circumferential surface portion extending between the first and second radial surface portions, the circumferential surface being provided with first and second axially extending grooves arranged in a parallel and offset relationship with each other so that a first groove extends axially between two adjacent second grooves, the first grooves extending axially from the first radial surface portion and terminating short of the second radial surface portion, and the second grooves extending axially from the second radial surface and terminating short of the first radial surface portion;

a floating bushing element having an inner axially extending bearing surface, the bushing element radially enclosing the rotor so that the circumferential surface on the rotor and the bearing surface on the bushing element define a fluid lubricated interface therebetween, and the bearing surface having a compliant surface cooperating with the first and second grooves to promote the flow of fluid from the first grooves to the second grooves; and means for maintaining a fluid seal between the bushing element and the housing while accomodating radial displacements of the bushing element relative to the housing, the fluid seal means including a spring means attached to one end portion of the bushing element and connected to the housing for biasing the other end portion of the bushing element against the housing to form a fluid seal therebetween.

10. The assembly according to claim 9, wherein the compliant surface is formed of material selected from the group of neoprene, synthetic and natural rubber, polyurethane, polyimide resins, polyamide resins, carbon-graphites, and Buna-N.

11. The assembly according to claim 10, wherein the first and second grooves axially overlap in spaced apart parallel relationship of from about twenty percent to about fifty percent of the distance between the first and second radial surfaces.

12. The assembly according to claim 11, wherein the grooves have a depth of about one-thirty-second of an inch and the compliant surface has a thickness of about one-eight of an inch.

13. The assembly according to claim 9, wherein the first and second grooves axially overlap in spaced apart parallel relationship of from about twenty percent to about fifty percent of the distance between the first and second radial surfaces.

14. The assembly according to claim 9, wherein the first and second grooves axially overlap in spaced apart parallel relationship from about fifteen percent to about fifty percent of one-half the sum of the average length of the first and second grooves.

15. A shaft seal assembly for providing controlled leakage of fluid from a high fluid pressure side of the seal assembly to a lower fluid pressure side of the seal assembly, comprising:

two parts movable relative to each other; and bearing surfaces on the respective parts facing each other to define a fluid lubricated interface therebetween, wherein one of the surfaces contains a plurality of first and second grooves arranged in a substantially parallel and offset relationship with each other so that a first groove extends between adjacent second grooves, the first grooves communicating with the high pressure side of the seal assembly and terminating short of the lower pressure side of the seal assembly, and the second grooves communicating with the lower pressure side of the seal assembly and terminating short of the high pressure side of the seal assembly so that fluid flows from the first grooves to the second grooves as the bearing surfaces of the two parts move relative to each other.

16. The shaft seal assembly according to claim 15, wherein the other of said surfaces comprises a compliant surface means cooperating with the first and second grooves to promote flow of fluid from the first grooves to the second grooves, wherein the compliant surface means is formed of material selected from the group of neoprene, synthetic and natural rubber, polyurethane, polyimide resins, polyamide resins, carbon-graphites, and Buna-N.

* * * * *